US005760877A

United States Patent [19]

Kunz

[11] Patent Number: 5,760,877

[45] Date of Patent: Jun. 2, 1998

[54] PROCESS AND DEVICE FOR PREPARING FILM STRIPS FOR SUBSEQUENT ORDERS

[75] Inventor: Jürg Kunz, Bülach, Switzerland

[73] Assignee: Gretag Imaging, AG, Regensdorf, Switzerland

[21] Appl. No.: 739,412

[22] Filed: Oct. 29, 1996

Related U.S. Application Data

[62] Division of Ser. No. 319,514, Oct. 7, 1994, Pat. No. 5,604, 564.

[30] Foreign Application Priority Data

Nov. 5, 1993 [EP] European Pat. Off. .............. 93810767

[51] Int. Cl.[6] .......................... G03B 27/32; G03B 27/52; G03B 27/62

[52] U.S. Cl. ................................ 355/40; 355/39; 355/41; 355/75

[58] Field of Search .................................. 355/38, 39, 40, 355/41, 77, 75; 250/259.2; 756/361, 378, 379

[56] References Cited

U.S. PATENT DOCUMENTS

| | | | |
|---|---|---|---|
| 3,947,109 | 3/1976 | Kinder et al. | 355/29 |
| 4,103,996 | 8/1978 | Fergg et al. . | |
| 4,128,330 | 12/1978 | Fergg et al. . | |
| 4,432,637 | 2/1984 | Baschung . | |
| 5,111,238 | 5/1992 | Honerkamp . | |
| 5,192,970 | 3/1993 | Findeis et al. . | |
| 5,248,887 | 9/1993 | Oberhardt . | |
| 5,253,011 | 10/1993 | Zahn et al. . | |
| 5,309,199 | 5/1994 | Frick . | |

FOREIGN PATENT DOCUMENTS

| | | |
|---|---|---|
| 0554 639 | 8/1993 | European Pat. Off. . |
| 1 601 289 | 10/1981 | United Kingdom . |

OTHER PUBLICATIONS

European Search Report EP 93 81 0767 (3 pages).

*Primary Examiner*—R. L. Moses
*Assistant Examiner*—Shival Virmani
*Attorney, Agent, or Firm*—Burns, Doane, Swecker & Mathis, LLP

[57] ABSTRACT

Process for preparing film strips for subsequent orders, the film strips belonging to a customer order. Each film strip includes a number of numbered masters which are fed into a preparation station. There, they are glued to a carrier belt and coiled into a film roll, which can be used at subsequent processing stations. Customer-specific order data regarding the desired number of copies of specific masters and, where applicable, the desired copy format, are entered via an input unit in the preparation station and stored onto a carrier medium which is compatible with the subsequent processing stations. In the process, the customer-specific order data are entered before the film strips are fed in. The fed-in film strips are automatically checked, before gluing to the carrier belt, for their position parallel to the conveyance direction and for the number order of the masters on the respective film strip, and by comparing with the customer-specific order data entered, it is checked whether the fed-in film strip is required for processing the customer order. If a film strip is improperly positioned or if a film strip is superfluous for processing the order, the operating personnel's attention is automatically drawn to the respective error, or the concerned film strip is automatically expelled before being glued to the carrier belt. A device according to the invention has an insertion area for the film strips which is equipped with at least one photoelectric sensor before a pair of draw-in rollers and which has, following the pair of draw-in rollers, a photoelectric scanner for the master numbers.

6 Claims, 3 Drawing Sheets

PROCESS AND DEVICE FOR PREPARING FILM STRIPS FOR SUBSEQUENT ORDERS

This application is a divisional of application Ser. No. 08/319,514, filed Oct. 7, 1994, now U.S. Pat No. 5,604,564.

BACKGROUND OF INVENTION

The present invention relates generally to processes and devices for preparing film strips for subsequent orders.

In the photo finishing industry, customers typically get back their developed negative films cut in strips instead of in single pieces. These film strips normally contain 4 to 6 negative images. If the customer intends to subsequently order further pictures at a later date, he selects the corresponding negative from the first order with the help of the already existing paper image. Depending on the manner in which the negative film strips are presented, there are different ways for the customer to inform the photo lab which negative on the respective film strip is to be used to prepare paper images, and how many paper images are to be prepared.

With film strips having a paper strip, known as a "tab strip", glued along their longitudinal edge, the customer can mark on the paper strip under the respective negative the number of copies and, where necessary, the desired picture form at.

If the customer gets the cut film strips back without glued tab strips, a table containing all negative numbers is often printed on the packaging of the film strips or on the order bag. The customer or the operating personnel in the photo shop then reads the corresponding negative number on the film strip and records on the table the desired number of copies and, where necessary, the image format as well.

With some first processing runs of customer orders, the negative numbers can also be already printed on the reverse of the specific related picture. In this case, the customer simply reads the corresponding number from the reverse of the picture and records this number and, where necessary, the desired image format on a table on the order bag. The customer no longer has to look through the cut film strips for the negatives he wants, but rather he places all related film strips of a first-order into the order bag.

The order bag provided with the customer's address is finally delivered to the photo lab. So that the various subsequent orders can be processed rationally in a large photo finishing lab, the individual cut film strips from several orders are usually glued to a carrier belt in a preparation station and coiled into a film roll. In the process, the order data are also detected, entered into the preparation station and transferred onto a data carrier, for example a computer diskette or the like. The film roll and the data carrier are then passed on to a further processing station, for example a photographic printer, in which the orders are preferably processed fully automatically and the desired photographic copy-prints are produced. There are usually two methods for entering the order data of an order, depending on the type of customer order.

With film strips with glued-on tab strips, the customer must record his selections below the corresponding negative on the strip. The operating personnel at the preparation station reads the customer details from the tab strip of the respective film strip and enters these data via a keyboard into the preparation station either before or after introducing the film strip.

In cases where the order-specific customer data are contained in a table that is printed on the order bag or on other packaging elements of the film strips, the operating personnel selects what is known as a table mode at the preparation station and enters the customer details contained in the table via a keyboard into the preparation station. In the process, what is known as a device table is prepared inside the apparatus; it essentially represents an electronic copy of the table filled out by the customer. After this, the operating personnel inserts the cut film strips individually in random order into the preparation station, where they are glued to a carrier belt in a further sequence. To guarantee that the negatives on the inserted film strip are properly correlated with the customer data on the device table, the operating personnel must always inform the preparation station of the respective first negative number of the inserted film strip as well. In addition, the operating personnel must make sure that the film strips are always inserted in the same manner, i.e., the emulsion side of the film strips must be in the proper position (usually facing down), and a once selected type of negative number sequence, ascending or descending, must be maintained.

When inserting the cut film strips into the preparation station, where they are glued to a carrier belt and coiled into a film roll, one must often watch out for a number of faulty manipulations which can negatively affect the work process and especially the processing time of a customer order. It can occur that a film strip is inserted slightly crooked and is glued to the carrier belt in this position. Besides the fact that this can lead to disturbances in the guiding of the film material in subsequent fully automatic processing stations, pictures with unattractive edges are often produced in this way. Such pictures are unacceptable for the customer as a rule, and the copying process must be repeated with properly positioned film strips. It also occurs that film strips are inserted with the emulsion layer on the wrong side and are glued to the carrier belt in this position. This later leads to laterally reversed, blurred images which are equally unacceptable and result in repeating the entire process. Especially with images containing motifs and lettering, the writing is portrayed reversed in this case, which is of course completely unacceptable.

Often, film strips are also inserted that do not contain any negatives of which the customer wants a print. This is especially the case when the customer sends all film strips along with the print order. In this way, many film strips are unnecessarily glued to the carrier belt, and this can lead to massive productivity losses in the preparation station and much more so at the subsequent automatic processing stations.

With the known preparation stations, the elimination of all of these errors is only possible after the film strips are glued on. Provided the error is ascertained at all, the operating personnel can indicate to the apparatus that a film strip is to be removed. This procedure is relatively costly, however, since in this case, the already glued-on film strip must be detached from the carrier belt again and, where necessary, inserted anew. In the process, on the film roll glued together from individual film strips, a gap is created in the carrier belt, which can lead to disturbances in further processing in the subsequent, typically fully automatic stations. In addition, the preparation station is stopped while the error is being eliminated.

A process and a device for preparing film strips for subsequent orders is therefore desirable in which the aforementioned operating errors and superfluous insertions of unneeded film strips are compensated to the effect that no productivity losses occur. Disturbances and faulty exposures due to faulty positions of film strips should be avoided.

SUMMARY OF INVENTION

In a process according to exemplary embodiments of the invention for preparing film strips for subsequent orders, the film strips belonging to a customer order, which each contain one or more numbered masters are fed into a preparation station. There, they are glued to a carrier belt and coiled into a film roll, which can be used at subsequent processing stations. The customer-specific order data regarding the desired number of copy-prints of specific masters and, where necessary, the desired copy format, are also entered via an input unit into the preparation station and stored onto a carrier medium that is compatible with the subsequent processing stations. In the process, the customer-specific order data are entered before the film strips are fed in. Before they are glued to the carrier belt, the film strips fed in are automatically checked for their position parallel to the conveyance direction and for the number sequence of the masters on the respective film strip, and by comparing with the customer-specific order data entered, it is verified whether the film strip fed in is required for processing the customer order. In the case of a wrongly positioned film strip or if a film strip is superfluous for processing the order, the operating personnel's attention is automatically drawn to the respective error or the concerned film strip is automatically expelled before being glued to the carrier belt In this way, operating errors by the operating personnel are compensated and the source of possible disturbances and/or faulty further processing of the masters, for example faulty exposures, is reliably avoided. Film strips inserted crooked or reversed no longer have to be detached with difficulty from the carrier belt. By eliminating in preferably automatic manner film strips that are superfluous for processing a customer order because no images of the masters contained on them are desired, productivity losses at the preparation station and especially at the subsequent processing stations are avoided.

In an alternative embodiment of a process according to the invention, a film strip is inserted in such a way that it activates a sensor arranged immediately before a pair of draw-in rollers and, depending on the length of the film strip, at least a further photoelectric sensor is activated which is arranged in the insertion area of the preparation station parallel to the conveyance direction of the film strips at a predetermined distance from the first sensor. In the process, the activation of the first sensor starts a drive for the pair of draw-in rollers and, where applicable, for further pairs of conveyance rollers. The film strip is advanced manually until its front edge is grasped by the pair of draw-in rollers and the film strip is automatically drawn in further. The rotation of the counter-roller of the pair of draw-in rollers is measured with a rotation sensor, preferably with an angle encoder, to measure the distance the film strip travels. With the help of a photoelectric scanner arranged in the conveyance direction of the film strip behind the pair of draw-in rollers, the proceeding front edge of the film strip is detected and a DX code arranged to the side of the first master and with start and stop sequence and a coded master number is read. From the legibility of the DX code, the proper position of the film strip can be determined. From the position of the DX code, the position of the emulsion side of the film strip can also be determined. For example, if the start sequence of the DX code is detected before the adjacent coded master number, an ascending number order is concluded, and if the stop sequence of the DX code is detected before the adjacent coded master number, a descending number order is concluded. When the rear end of the film strip is detected, the length of the film strip is determined from the distance of the responding sensor located before the pair of draw-in rollers, and from the detected rotations of the counter-roller of the pair of draw-in rollers. From the film length and the information on the ascending or descending number order of the masters, the master numbers on the film strip can be determined. Using the previously entered device table, it is then automatically determined whether copies of the masters on the concerned film strip are desired. If this is the case, and provided the film strip was properly inserted and its emulsion side is properly positioned, the concerned film strip is forwarded to a pair of deflection rollers over which is guided a carrier belt to which the film strip is glued in a further sequence. If the film strip is wrongly positioned or if it is established that the film strip is not needed for processing the order, it can be expelled by automatically reversing against the feed-in direction the rotation motion of the pair of draw-in rollers and, where applicable, of further pairs of conveyance rollers, or the film strip can be removed from the preparation station via an alternative conveyance route.

Exemplary embodiments of a device according to the invention for preparing film strips for subsequent orders comprise an insertion area in which a number of film strips with masters of a customer order are guided along a work surface to a pair of draw-in rollers, a gluing station for gluing the fed-in film strips to a carrier belt which is guided over a pair of deflection rollers, and a computer into which customer-specific order data regarding the desired number of copies of specific masters and, where applicable, the desired copy format are entered and are recorded onto a storage medium compatible with further processing stations. In relation to the conveyance direction of the film strips in the device, in front of the pair of draw-in rollers at least a first and a second photoelectric sensor for detecting the lateral edge and the rear end of a fed-in film strip are provided at a predetermined distance from the pair of draw-in rollers. The first sensor located closer to the pair of draw-in rollers can control drive means for the pair of draw-in rollers and, where applicable, for further pairs of conveyance rollers. The counter-roller of the pair of draw-in rollers is linked to a rotation detector, such as an angle encoder. At a predetermined distance behind the pair of draw-in rollers, a photoelectric scanner can be arranged which detects the advanced front edge of the film strip and is designed to recognize master numbers printed at the side of each master on the film strip. The photoelectric sensors, the rotation detector, the photoelectric scanner, the drive means for the pair of draw-in rollers and any further conveyance rollers, as well as drive means for the pair of deflection rollers in the gluing station, can be connected to the computer in such a way that on the one hand, detected signals and information are forwarded to the computer and, on the other hand, control signals can be given to the corresponding drive means and, where applicable, to other connected conveyance means for the film strips. With such a device, a process according to the invention can be very easily executed.

In order to reliably grasp film strips of different lengths and to be able to reliably determine their length, exemplary embodiments can include three photoelectric sensors in the processing station before the pair of draw-in rollers in relation to the conveyance direction of the film strips, for detecting the lateral edge and the rear end of a fed-in film strip at a predetermined distance from the pair of draw-in rollers.

The photoelectric scanning device can be a DX code reader, since in this case, the information contained in a DX code at the side of the masters can be called on to execute a process according to exemplary embodiments of the invention. In particular, it is thereby possible to use the start and stop sequences of the DX code in the process for determining the master number sequence, thus further simplifying the procedure.

The pair of draw-in rollers and, where applicable, the further pairs of conveyance rollers can be driven in the draw-in direction and in the opposite direction, so that in this way, unneeded film strips or those not properly inserted can be expelled again in the feed-in direction.

As an alternate embodiment, behind the photoelectric scanner but before the pair of deflection rollers in relation to the draw-in direction of the film strips, a switch and further film conveyance means can be provided in the conveyance path of the film strips. These conveyance means can be controlled by the computer and where necessary, if a film strip is to be expelled, they can be activated by the computer. In this way, a film strip can be expelled from the preparation station on an alternative path.

As a general rule, the cut film strips typically have from four to six full-format miniature masters or a correspondingly greater number of half-format masters. It is especially advantageous for application of a process according to the invention to all commonly occurring film strip lengths, if the distance of the first photoelectric sensor from the pair of draw-in rollers is about 10 mm to 20 mm and if a second and, where necessary, a third photoelectric sensor are each arranged at a distance of about 30 mm to about 80 mm from the preceding sensor. In the process, distance of the photoelectric scanner from the pair of draw-in rollers can be about 10 mm to about 30 mm.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
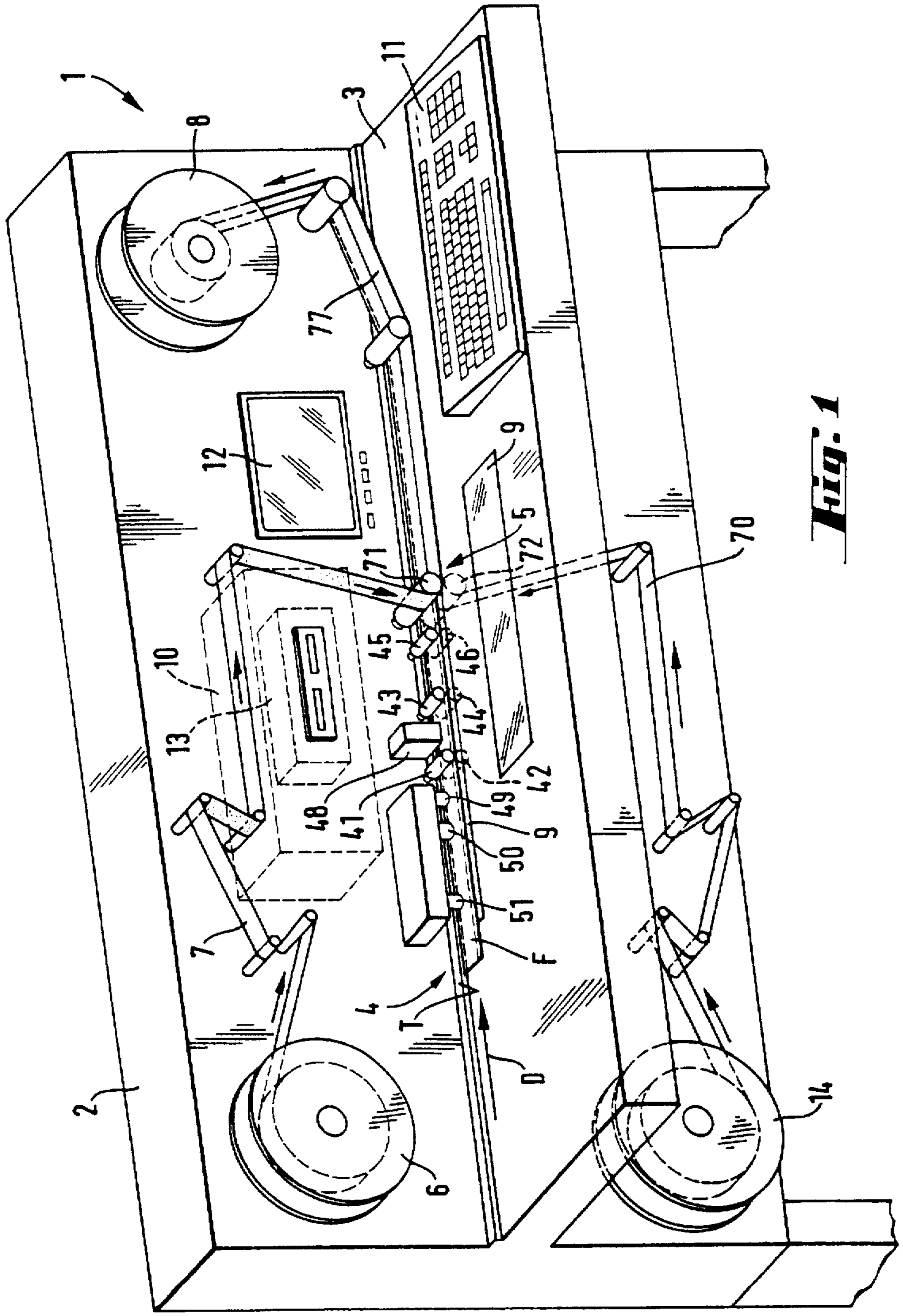
FIG. 1 shows a preparation station for film strips.

In FIG. 1, a preparation station for film strips is designated collectively by reference number 1. Such apparatuses are used in large labs where individual cut film strips of a subsequent order with usually 4 to 6 masters, normally negative masters, are glued to a carrier belt and then coiled onto a film coil. This coil with the film strips glued to the carrier belt is attached at the entrance to a photographic printer, then the customer order is basically processed in completely automatic manner according to the order data.

The apparatus has a housing 2 in which various electronic, electric and mechanical equipment components, for example drive means for film conveyance systems, etc., are housed. A work table 3 extends horizontally over the length of the housing 2 and serves as work surface for the operating personnel. On the work table 3 is an insertion area 4 for the film strips and adjacent to this, a gluing station 5 in which the individual film strips are glued to what is preferably a carrier belt. Usually, the carrier belt 77 includes an adhesive strip 7 and a paper strip 70, which are glued together in such a way that the outermost longitudinal edge of the film strips is positioned between the strips and glued to the adhesive strip 7. The adhesive strip 7 is uncoiled from a supply reel 6 that can be attached above the work table 3 on the front side of the housing. A second supply reel 14 with the paper strip 70 is arranged under the work table 3 and is fed to the gluing station 5. The strips glued together into the carrier belt 77 in the gluing station 5 are coiled onto a take-up reel 8 that can be attached on the front side of the housing.

Lighting surfaces 9 are imbedded into the work table 3; they enable the operating personnel to observe the masters on the film strips. A keyboard 11 integrated into the work table is connected to a computer 10 housed in the housing 2. The customer-specific order data and any correction values can be entered into the computer 10 via this keyboard. The computer has a display device 12 through which the information entered via the keyboard 11 can be checked by the operating personnel. But if necessary, the display device 12 can also display reports and information, for example error reports. The display device 12 is, for example, a display or a screen. The data entered by the operating personnel are stored onto a storage medium 13 which is compatible with the subsequent processing stations. Magnetic tape cassettes or computer diskettes are, for example, used as storage medium. In this way, all reorder data belonging to the film strips coiled onto the film coil 8 are stored on a magnetic tape or a computer diskette and can then be forwarded along with the film coil to the subsequent processing stations.

Figure 2:
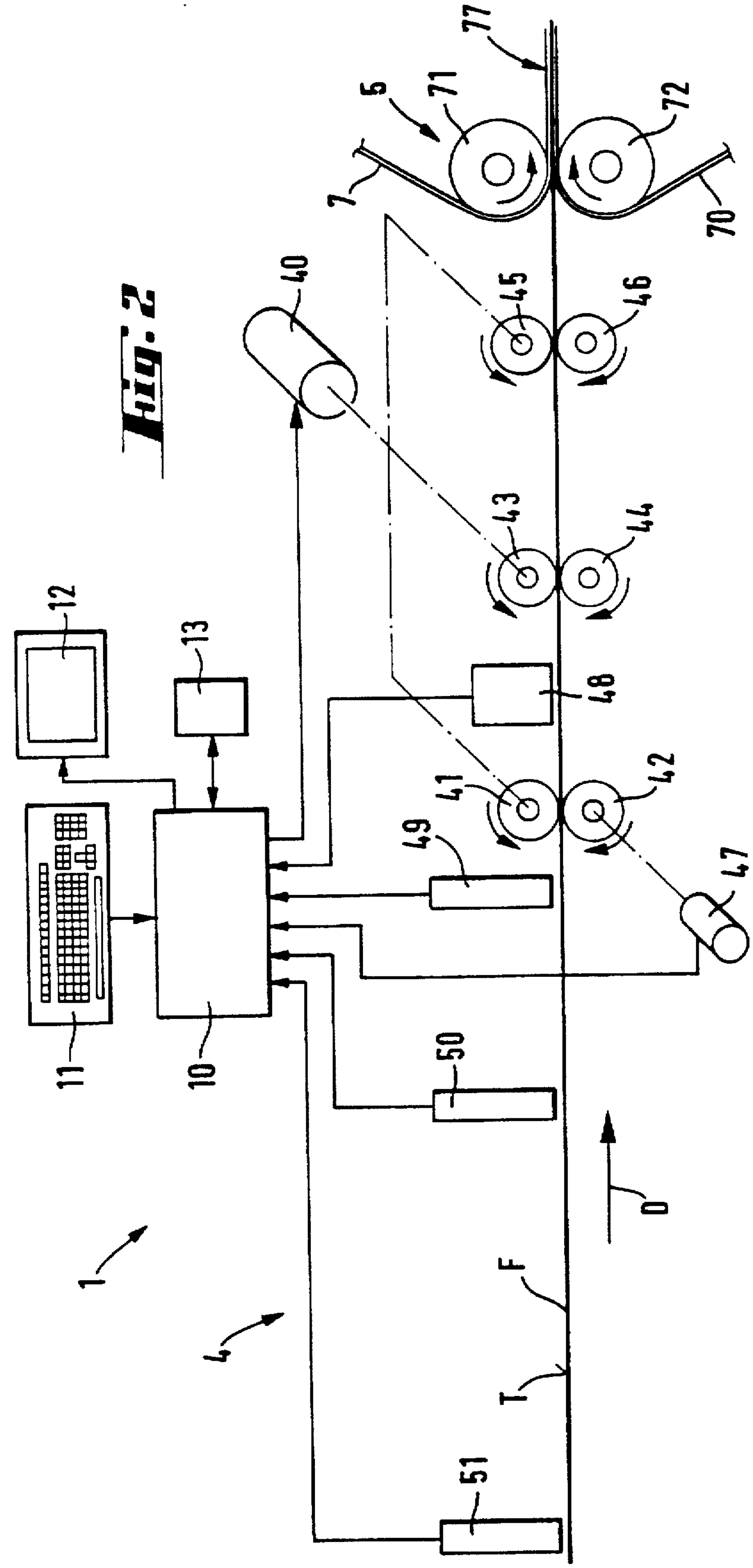
FIG. 2 shows a side view of an area of the device which is a subject of the present invention.
Figure 3:
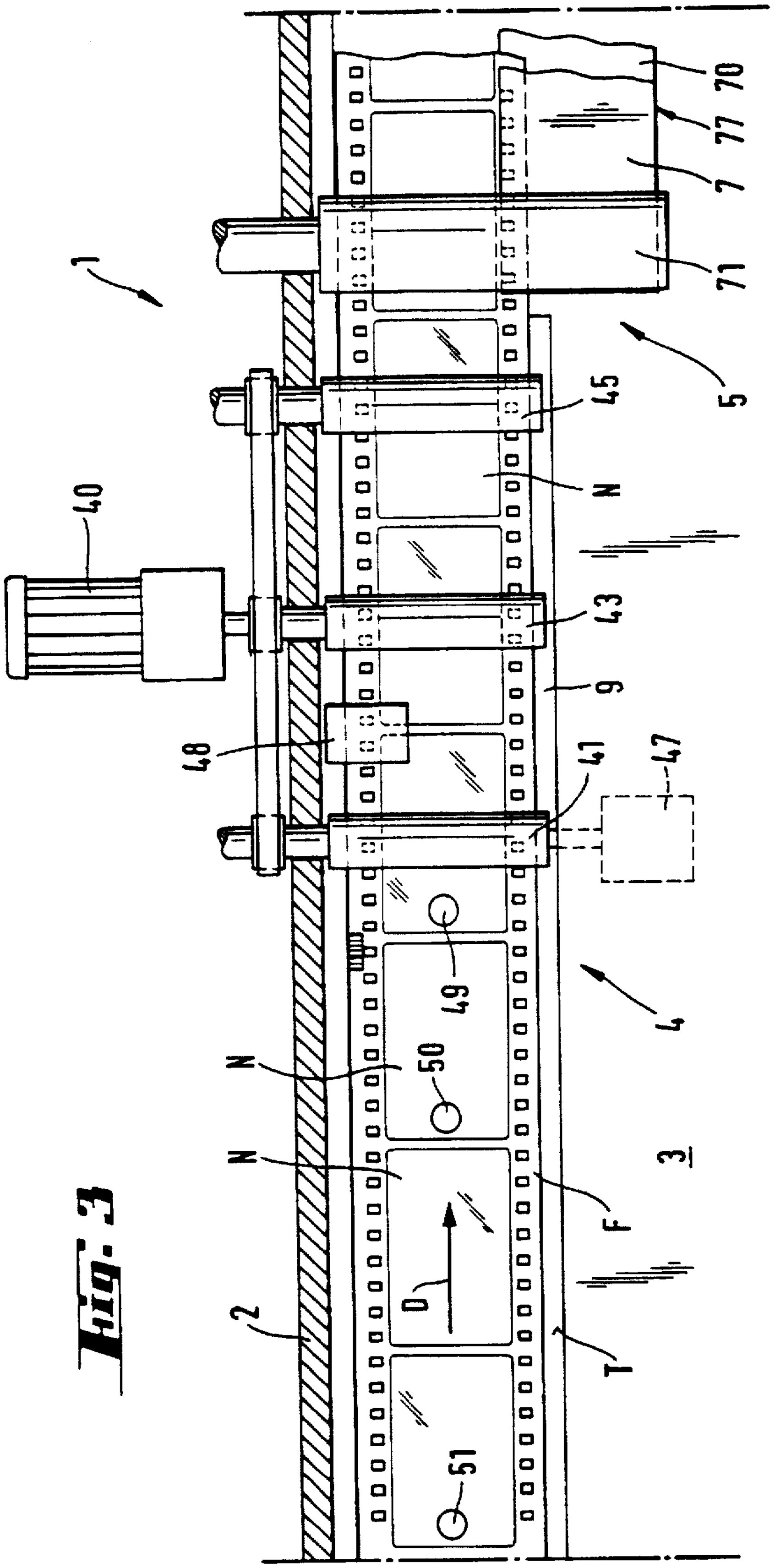
FIG. 3 shows a top view of an area of the device which is a subject of the present invention.

The area of the preparation station 1 pertinent to the invention basically comprises the insertion area 4 for the film strips up to the gluing station 5. This area is shown in FIGS. 2 and 3 in side view and vertical section, respectively. The insertion area 4 has a pair of draw-in rollers 41,42 and, where necessary, further pairs of conveyance rollers 43,44 or 45,46, respectively, which can be driven via a motor 40. In the process, only one roller is driven at any given time, while the second forms a counter-roller. In an exemplary execution, the rollers with odd reference numbers 41,43,45 can be driven, while those with even reference numbers 42,44,46 represent the counter-rollers. A rotation detector 47 monitors the counter-roller 42 of the pair of draw-in rollers 41,42 and is linked with the computer 10. The rotation detector 47 is preferably an angle encoder; in this way, one can not only detect whether the counter-roller 42 is turning, but the rotations over the measured angle can also be counted. It is advantageous to arrange the rotation detector 47 at the counter-roller 42, since the latter rolls off exactly on the incoming film strip F. The angle information of the rotation detector 47 can be converted in the computer into length units by which the film strip F is advanced by the pair of draw-in rollers 41,42. The inserted film strip is conveyed along the conveyance plane T between the pairs of rollers. The conveyance direction D runs in an exemplary execution from left to right, from the pair of draw-in rollers 41,42 to a pair of deflection rollers 71,72 in the gluing station 5. The adhesive strip 7 as well as the paper strip 70 are guided over the deflection rollers 71,72. When a film strip F is being conveyed between the deflection rollers 71,72, the adhesive strip is glued along its outermost longitudinal edge and on the paper strip 70, and in this way the film strip is connected to the carrier belt 77.

Before the pair of draw-in rollers 41,42, three photoelectric sensors are arranged that are linked with the computer 10 via signal lines not shown in greater detail. Counting from the pair of draw-in rollers 41,42, these are a first 49, a second 50 and a third sensor 51. The distance of the first photoelectric sensor 49 from the pair of draw-in rollers 41,42 is about 10 mm to 20 mm. The second and the third sensors 50/51 are each at a distance of about 30 mm to about 80 mm from the respective preceding sensor 49/50, respectively. In the process, the arrangement of the sensors 49–51 is parallel to the conveyance direction D of the film strips F.

The signals of the first sensor 49 can also be used to control the drive motor 40 for the pair of draw-in rollers 41,42 and the further pairs of conveyance rollers 43,44 or 45,46, respectively. It is understood that the drive motor for the pair of draw-in rollers 41,42 and for the further pairs of conveyance rollers 43,44 or 45,46, respectively, can also be controlled in a different manner. For example, the rotation detector 47 at the counter-roller 42 of the pair of draw-in rollers 41,42 can also be used for this. When the advancing front edge of the film strip F enters the gap between the driven roller 41 and the counter-roller 42, the counter-roller 42 is turned. The rotating motion is detected and as a result, the drive motor 40 is activated.

The photoelectric sensors 49–51 serve to detect the rear end of the inserted film strip F. From the detection of the rear end of the film strip F and the angle information of the rotation detector 47, the length of the inserted film strip F is determined in the computer 10. This is done simply by adding the advance distance determined from the angle information, and the distance of the sensor that determined the rear end of the film strip F from the pair of draw-in rollers 41,42. In principle, two sensors are sufficient for checking the proper position of an inserted film strip F; however, as shown, preferably three photoelectric sensors 49–51 are provided, since in this way, film strips F of different lengths can be measured without having to modify the distance existing in known preparation stations between the pair of draw-in rollers 41,42 and the pair of deflection rollers 71,72. The advantage of this is that already existing apparatuses can also be reequipped to be suitable for application of a process according to the invention. Behind the pair of draw-in rollers 41,42 (in relation to the conveyance direction D of the film strips F), a photoelectric scanner 48 is arranged that is linked with the computer 10 via a signal line not shown in detail. With the help of this scanner 48, the numbers of the masters N on the passing film strip F, as well as any lateral shift of the film strip F, for example due to crooked insertion, are determined. This takes place simply by ascertaining whether the numbers can be read at all. Moreover, with the scanner 48, the proper position of the emulsion side of the film strip F can also be ascertained.

The scanner 48 can be a DX code reader that scans the DX code arranged on the film strip F to the side of each master N. In this way, the master number contained in the DX code can be determined. The DX codes are very narrow, such that any lateral shift of the film strip F results in an incomplete detection of the code by the DX code reader. In this regard, it is especially advantageous for each DX code to have a start sequence and a stop sequence. Depending on whether a start sequence or a stop sequence is first adjacent to the DX code reader, it is thus established whether the master numbers on the film strip F are in ascending or descending order, in this way, one can also establish whether the emulsion side of the film strip F is in the proper position. For these verifications, it is generally sufficient to read the first DX code on the film strip. Only if this first DX code is illegible, for example because it is destroyed, does the next legible DX code have to be used.

From the information on whether the order of the numbers of the masters N on the film strip F is ascending or descending, and from the determined length of the film strip F, the masters N on the film strip F can be clearly identified. Only in the case of half-format masters N does this information have to be conveyed to the computer 10. This can be done manually by entry via the keyboard 11, or with the help of a sensor that detects the bridge between the masters N. From the distance between the bridges, one can then conclude the format of the masters on the film strip. Such a sensor can also be provided before the pair of draw-in rollers 41,42, but the first sensor 49 or even the DX code reader 48 can also be used for this. The determined master numbers on the adjacent film strip F are compared with the customer details entered into the computer 10 and it is then decided whether the concerned film strip is required for processing the subsequent order and should be glued to the carrier belt 77, or if it should be expelled from the apparatus.

To be able to expel a film strip F from the apparatus, it is useful for the pair of draw-in rollers 41,42 and the pairs of conveyance rollers 43,44 or 45,46, respectively, to also be able to driven against the draw-in direction D. If a film strip F is then to be expelled, the computer 10 gives a corresponding signal to the drive motor 40 for the pair of draw-in rollers 41,42 and the further pairs of conveyance rollers 43,44 or 45,46, respectively. The motor turns in the opposite direction, the rotation direction of the pairs of rollers reverses accordingly, and the film strip F is expelled against the draw-in direction D. In an alternative form of execution of the invention, between the second pair of conveyance rollers 45,46 and the pair of deflection rollers 71,72 of the gluing station 5, a switch and further conveyance means for a film strip F can be provided which are controlled by the computer 10. Such a switch is described in EP-A-0,554,639, the contents of which are hereby incorporated by reference in their entirety. The switch and the further conveyance means are activated, when necessary, if a film strip F is to be expelled. In this case, the film strip is not expelled against the draw-in direction, but rather it is conveyed to an output area arranged above, below or to the side of the insertion area 4.

An exemplary process according to the invention can be carried out in the manner described below:

The film strip F with a number of masters N is inserted in such a way that it activates the first and second photoelectric sensors 49/50 arranged before the pair of draw-in rollers 41,42. Depending on the length of the film strip F, the third photoelectric sensor 51 is also activated in the process by the advanced longitudinal edge of the film strip F. The signals generated by the sensors 49–51 are forwarded to the computer 10.

The activation of the first sensor 49 starts the drive motor 40 for the pair of draw-in rollers 41,42 and any further pairs of conveyance rollers 43,44 or 45,46, respectively, that are provided.

The film strip F is manually advanced until its front edge is grasped by the pair of draw-in rollers 41,42 and the film strip F is automatically drawn in further.

As soon as the film strip arrives between the driven roller 41 and the counter-roller 42 of the pair of draw-in rollers, pressed against the drive roller 41 with spring power, the counter-roller 42 rolls off on the film strip. The rotation of the counter-roller 42 is measured with the rotation sensor 47 in order to thereby measure the distance by which the film strip F is advanced by the pair of draw-in rollers.

With the help of the photoelectric scanner 48, arranged in the conveyance direction D of the film strip F behind the pair of draw-in rollers 41,42, the advancing front edge of the film strip is detected Further, the first legible DX code, arranged to the side of the first master, with a start and stop sequence and with the coded master number, is read.

From the legibility of the DX code, the proper position of the film strip can be determined.

When the start sequence of the DX code is adjacent to and before the coded master number, an ascending number order is considered to exist, and when the stop sequence of the DX code is adjacent to and before the coded master number, a descending number order of the masters N on the film strip F is considered to exist.

Based on the order of the occurrence of start sequence and stop sequence, and based on the ascertained position of the DX code either along the right or the left longitudinal side of the film strip, as seen in conveyance direction, the proper position of the emulsion side of the film strip F can also be verified.

When the rear end of the film strip F is detected, the length of the film strip F is determined from the distance of the responding sensor from the pair of draw-in rollers 41,42, and from the detected rotations of the counter-roller 42 of the pair of draw-in rollers.

From the determined length and the information on the ascending or descending number order of the masters N, the master numbers on the film strip can be determined.

Using the customer-specific order data previously entered into the computer 10, an automatic determination can be made regarding whether copies are desired of the masters N present on the concerned film strip F.

If this is the case, and provided the film strip F was properly inserted and its emulsion side is properly positioned, the concerned film strip F is forwarded to the pair of deflection rollers 71,72 arranged in the gluing station 5. The adhesive strip 7 or the paper strip 70, respectively, to which the film strip F is glued in a further sequence, are then guided over this pair of rollers.

If the film strip F is improperly positioned or if it is determined that the film strip F is not needed for processing the order, the film strip is expelled again by automatically reversing, against the feed-in direction, the rotation motion of the pair of draw-in rollers 41,42 and, where applicable, of any further pairs of conveyance rollers 43,44 or 45,46, respectively. Alternately, the film strip is removed from the preparation station via an alternative conveyance route.

In an exemplary process with respect to an exemplary device for preparing film strips for subsequent orders, the most common operating errors can be compensated by the operating personnel without the occurrence of major interruptions in the work process. The personnel no longer have to worry about the film strips always being inserted in a once selected, predetermined orientation (such as negative number order ascending or descending). Also, film strips wrongly inserted with respect to the position of their emulsion side are reliably recognized and the operating personnel's attention can be drawn to this. Improperly inserted film strips, and those that are superfluous for processing a subsequent order, are not glued to the carrier bell In this way, time-consuming repair activities are dispensed with and major gaps that can lead to disturbances in the subsequent processing stations are avoided. The film strips coiled onto a film coil, cut and glued to the carrier belt are always in the proper position and productivity losses due to superfluous film strips are avoided. Apparatus changes in accordance with exemplary embodiments are also suitable for reequipping already existing preparation stations, to be able to work according to a process of the invention.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Device for preparing one or more film strips comprising:

an insertion area into which a film strip having a number of masters is guided along a work surface to a pair of draw-in rollers;

a gluing station with a pair of deflection rollers for gluing the fed-in film strips to a carrier belt;

a computer into which order data regarding the desired number of copies of specific masters and, where applicable, a desired copy format are entered and recorded onto a storage medium compatible with further processing stations;

at least one photoelectric sensor located before the pair of draw-in rollers in the conveyance direction of the film strip for detecting a rear end of the film strip; said photoelectric scanner being provided at a predetermined distance before the pair of draw-in rollers;

a rotation detector linked to a counter-roller of the pair of draw-in rollers;

a photoelectric scanner arranged a predetermined distance behind the pair of draw-in rollers for detecting an advanced front edge of the film strip to recognize master numbers printed to a side of each master on the film strip, the photoelectric scanner, a drive means for the pair of draw-in rollers and a pair of deflection rollers being linked with the computer such that on the one hand, detected signals and information can be forwarded to the computer and on the other hand, control signals can be passed to the drive means.

2. Device according to claim 1, further including:

three photoelectric sensors arranged before the pair of draw-in rollers in relation to the conveyance direction of the film strip for detecting the rear end of the film strip a predetermined distance before the pair of draw-in rollers.

3. Device according to claim 1, wherein the photoelectric scanner is a DX code reader.

4. Device according to claim 1, wherein the pair of draw-in rollers and, where applicable, further pairs of conveyance rollers can be driven in the draw-in direction and in a direction opposite the draw-in direction.

5. Device according to claim 1, further comprising:

a switch and an alternate film conveyance path of the film strip, arranged in relation to the draw-in direction of the film strip behind the photoelectric scanner but before the pair of deflection rollers in the conveyance path of the film strip, the switch and the alternate film conveyance path being activated by the computer when a film strip is to be eliminated.

6. Device according to claim 2, wherein the distance of a photoelectric sensor before the pair of draw-in rollers is 10 mm to 20 mm and that a second and a third photoelectric sensor are arranged each at a distance of 30 mm to 80 mm from the preceding sensor, the distance of the photoelectric scanner from the pair of draw-in rollers being 10 mm to 30 mm.

* * * * *